United States Patent
Fauteux et al.

(10) Patent No.: US 6,388,869 B1
(45) Date of Patent: May 14, 2002

(54) MOBILE GENERATOR UNIT WITH REMOVABLE BREAKER BOX

(75) Inventors: Michel Fauteux; Pierre Bernard, both of Pierrefonds (CA)

(73) Assignee: Solutions Jupiter Inc., Montreal (CA)

( * ) Notice: Subject to any disclaimer, the term of this patent is extended or adjusted under 35 U.S.C. 154(b) by 0 days.

(21) Appl. No.: 09/664,792

(22) Filed: Sep. 19, 2000

(51) Int. Cl.$^7$ .................................................. H02B 1/26
(52) U.S. Cl. ........................ 361/625; 307/150; 361/606
(58) Field of Search .................... 200/51 R; 307/9.1, 307/10.1, 150; 180/53.8, 65.4; 361/602, 605, 606, 622, 625

(56) References Cited

U.S. PATENT DOCUMENTS

| | | | | |
|---|---|---|---|---|
| 3,717,805 A | * | 2/1973 | Gnaedinger et al. | 363/13 |
| 4,469,954 A | * | 9/1984 | Maehara | 290/1 A |
| 4,894,764 A | * | 1/1990 | Meyer et al. | 363/65 |
| 5,563,451 A | * | 10/1996 | Furukawa | 307/10.1 |
| 5,574,622 A | * | 11/1996 | Brown | 361/625 |

OTHER PUBLICATIONS

Onan Cummins—Generator set Catalogue—Powerful Solutions—Minneapolis, MN 55432 (1998).

* cited by examiner

*Primary Examiner*—Gerald Tolin
(74) *Attorney, Agent, or Firm*—François Martineau

(57) ABSTRACT

The power generator unit includes a container having a peripheral wall enclosing a power generating motor assembly. A breaker box is provided in an opening in the peripheral wall of the container, so as to have power outlet socket connectors accessible from outside of the container. An external electric circuit to be fed with electricity can be operatively connected to the power outlet socket connectors. Power inlet socket connectors are also provided in the breaker box, accessible from inside the container, to which the power generating motor assembly can be operatively and releasably connected. A breaker links the power inlet socket connectors to the power outlet socket connectors, to open the breaker box circuit should any excessive power demand occur. The breaker box is releasably bolted to the peripheral wall of the container, about the opening in which it is inserted. A pair of spaced-apart pockets are provided on the breaker box casing, being outwardly opened. Forks of a forklift truck can engage these pockets, to hold and carry the breaker box when removal or installation of the breaker box occurs.

9 Claims, 5 Drawing Sheets

MOBILE GENERATOR UNIT WITH REMOVABLE BREAKER BOX

FIELD OF THE INVENTION

The present invention relates to mobile generator units, and more particularly to a removable breaker box for a mobile generator unit.

BACKGROUND OF THE INVENTION

High power output mobile generator units are used to provide electricity where the regular electric grid is not accessible, where a power shortage occurs, or as a fall-back option in combination with the regular electric grid. These generator units include a power generating motor, and other affiliated devices such as a flywheel, a drive, a radiator, a muffler, etc., these elements being generally referred in the present specification as the power generating motor assembly which allows power to be fed through power outlets. The power generating motor assembly is carried in a container, the latter usually in the form of a semi-trailer that can be releasably attached to a truck, thus facilitating the transport thereof.

It is known to provide on the semi-trailer a breaker box which is linked to the power generating motor assembly to prevent excessive power output. The breaker box is installed inside the semi-trailer. The breaker box includes power outlet sockets in which the wire plugs of the electric circuit to be fed with electricity, are to be connected. Additional power inlet sockets are provided on the breaker box, wherein the wire plugs from the power generating motor assembly are connected. The electric current from the inlet sockets passes through a breaker before being dispatched to the outlet sockets. Thus, excessive current demand can be prevented with the breaker. The breaker can be reset in a known fashion after it has opened the electric circuit under the bias of excessive power demand.

A problem with the breaker box in conventional generator semi-trailers is that it is difficult to install and remove. Indeed, the rather heavy breaker box has to be carried into the semi-trailer through its rear doors, and then maintained in the correct position while it is fixed to the semi-trailer wall. This operation can be tedious, especially considering the limited space available inside the semi-trailer which is loaded with the power generating motor assembly. In addition to the initial installation of the breaker box, the breaker box has to be removed and reinstalled when the power generating motor has to be taken out from the semi-trailer for maintenance or replacement purposes, or when the breaker box itself has to be repaired or replaced, although the latter is less frequent. Indeed, the breaker box is a rather large device, and obstructs the rear opening of the semi-trailer when the rear doors of the latter are opened, thus effectively preventing the motor to be moved through the doors. The breaker box has to be installed at the rear end of the semi-trailer, next to the doors, for easy access thereto to re-initiate the breaker once it has been forced into an opened condition under excessive power demand. Thus, its position cannot be changed to a less obstructive position, for example at the front end of the semi-trailer.

OBJECTS OF THE INVENTION

It is therefore an object of the present invention to provide a removable breaker box for power generators installed in containers, which includes gripping members allowing easier handling the breaker box to facilitate installation and removal thereof from the container.

It is another object of the invention that the breaker box may be installed from the exterior of the container.

SUMMARY OF THE INVENTION

The present invention relates to a breaker box for use in a mobile generator unit of the type including a container and a power generating motor assembly in the container, said breaker box comprising:

a casing;

an accessible power inlet socket connection member mounted in said casing;

an accessible power outlet socket connection member mounted in said casing;

an accessible breaker mounted in said casing and connecting said inlet socket connection member and said outlet connection member;

pocket openings provided on said casing, for allowing external engagement therein of the forks or a forklift truck for moving and holding said casing; and an attachment member for releasably attaching said casing to the container.

The present invention also relates to a mobile generator unit comprising:

a container having a generally closed peripheral wall and defining an inner chamber;

a power generating motor assembly carried in said container inner chamber;

an opening in said peripheral wall;

a breaker box comprising a) a casing sized to fit into said opening in said peripheral wall;

b) a power inlet socket connection member mounted in said casing and accessible inside said container inner chamber;

c) a power outlet socket connection member mounted in said casing and accessible outside said container;

d) an accessible breaker mounted in said casing and connecting said inlet socket connection member and said outlet connection member for interrupting electrical current flow therebetween under excessive power demands; and e) pocket openings provided on said casing and accessible outside said container, for allowing external engagement therein of the forks or a forklift truck for moving and holding said casing;

an attachment member for releasably attaching said casing to said container peripheral wall; and an electric plug member connected to said power generating motor assembly and releasably connectable to said breaker box power inlet socket connection member for electrically connecting said breaker box to said power generating motor assembly.

Preferably, said attachment member includes a protruding peripheral edge portion on said breaker box, a complementary receiving edge portion on said container peripheral wall, and an attachment device for integrally attaching said breaker box peripheral edge portion to said container receiving edge portion.

Preferably, said attachment device is bolts.

Preferably, said casing further includes door flap members mounted thereto which can selectively close said pocket openings.

The present invention also relates to a method of installing with a forklift truck having a pair of forks, a breaker box as defined hereinabove on the container of a power generating unit as defined hereinabove, comprising the following steps:

a) inserting the forklift truck forks into the opened pockets of the breaker box;

b) moving the breaker box above ground outside of the container, by carrying it with the forklift truck, until it becomes aligned with the opening of the container;

c) sliding the breaker box into the container peripheral wall opening until the breaker box protruding edge portion abuts against the container receiving edge portion;

d) fixing the breaker box to the container by bolting the breaker box peripheral edge portion to the peripheral wall receiving edge portion;

e) removing the forks of the forklift truck from the opened pockets of the breaker box; and f) connecting the plug member to the breaker box power inlet socket connection member.

Preferably, the breaker box further includes door flap members, and the method further comprises the following step before step (a):

aa) moving the door flaps into an opened condition in which they do not obstruct the passage of the forks of the forklift truck into the pockets of the breaker box casing.

Preferably, the method further comprises the following step between steps (e) and (f):

ff) moving the door flaps into a closed condition in which they close the opened pockets of the breaker box casing.

The present invention further relates to a method for removing with a forklift truck having a pair of forks, a breaker box as defined hereinabove from the container of a power generator unit as defined hereinabove comprising the following steps:

a) disconnecting the plug member from the breaker box power inlet socket connection member;

b) inserting the forklift truck forks into the opened pockets of the breaker box;

c) disuniting the breaker box from the container by unbolting the breaker box peripheral edge portion from the peripheral wall receiving edge portion, the breaker box then coming to rest on the forks of the forklift truck;

d) sliding the breaker box out of the opening until it clears the container peripheral wall; and e) moving the breaker box above ground outside of the container, by carrying it with the forklift truck, until it is stored at a desired location.

Preferably, the breaker box further includes door flap members as defined hereinabove, and the method for removing the breaker box further comprises the following step between steps (a) and (b):

bb) moving the door flaps into an opened condition in which they do not obstruct the passage of the forks of the forklift truck into the pockets of the breaker box casing.

DETAILED DESCRIPTION OF THE EMBODIMENTS

Figure 1:
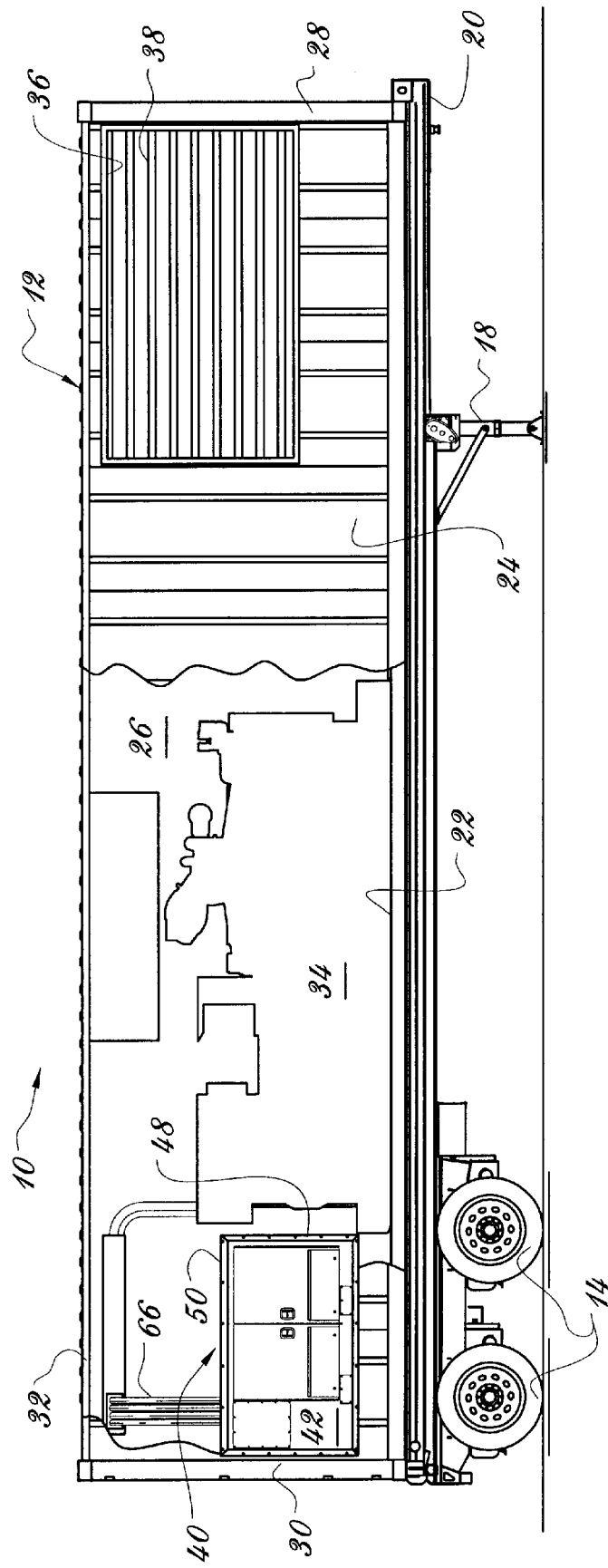
FIG. 1 is a side elevation of a mobile generator unit including a semi-trailer container, with part of the semi-trailer side wall being cut-away.
Figure 2:
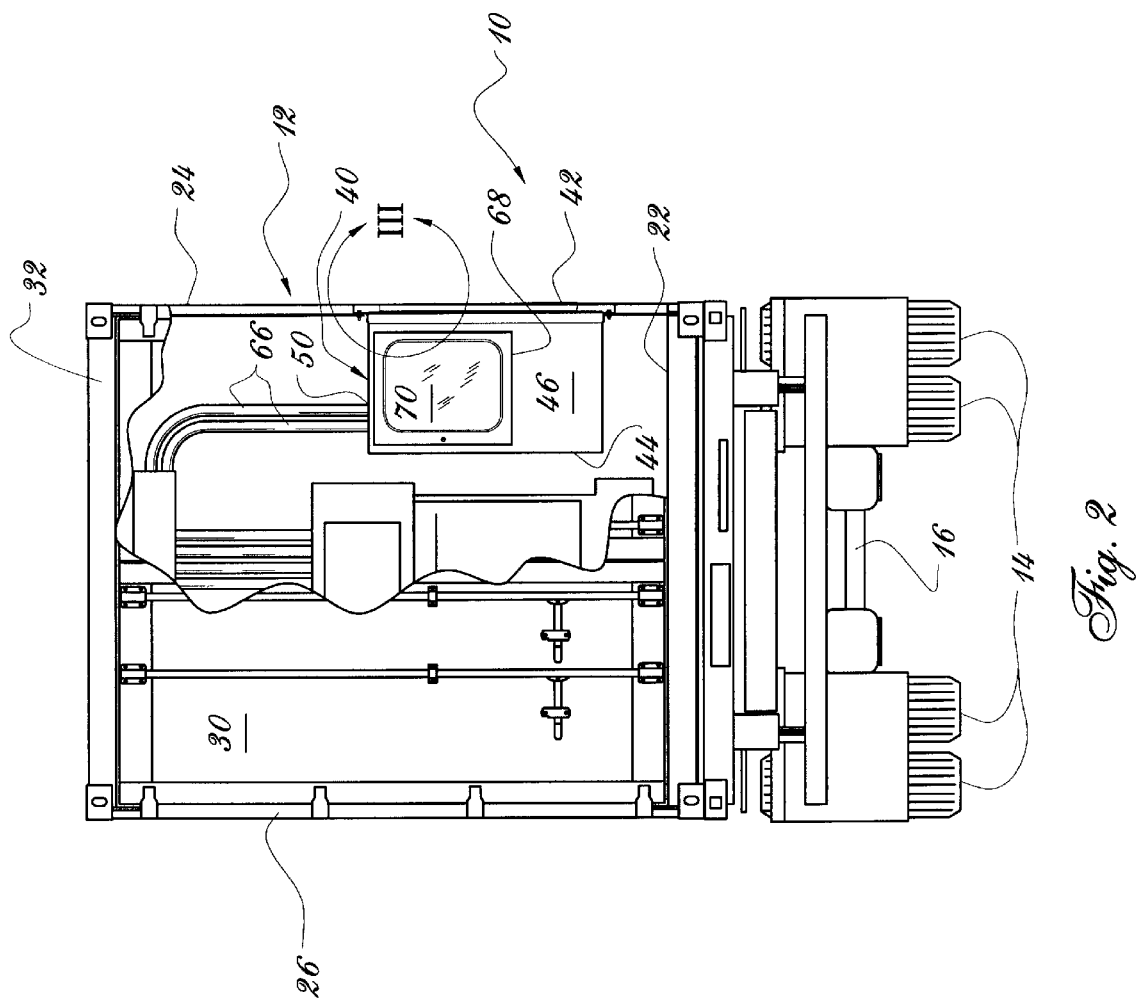
FIG. 2 is a rear elevation of the mobile generator unit of FIG. 1, with the rear doors of the semi-trailer container being partly cut-away.
Figure 3:
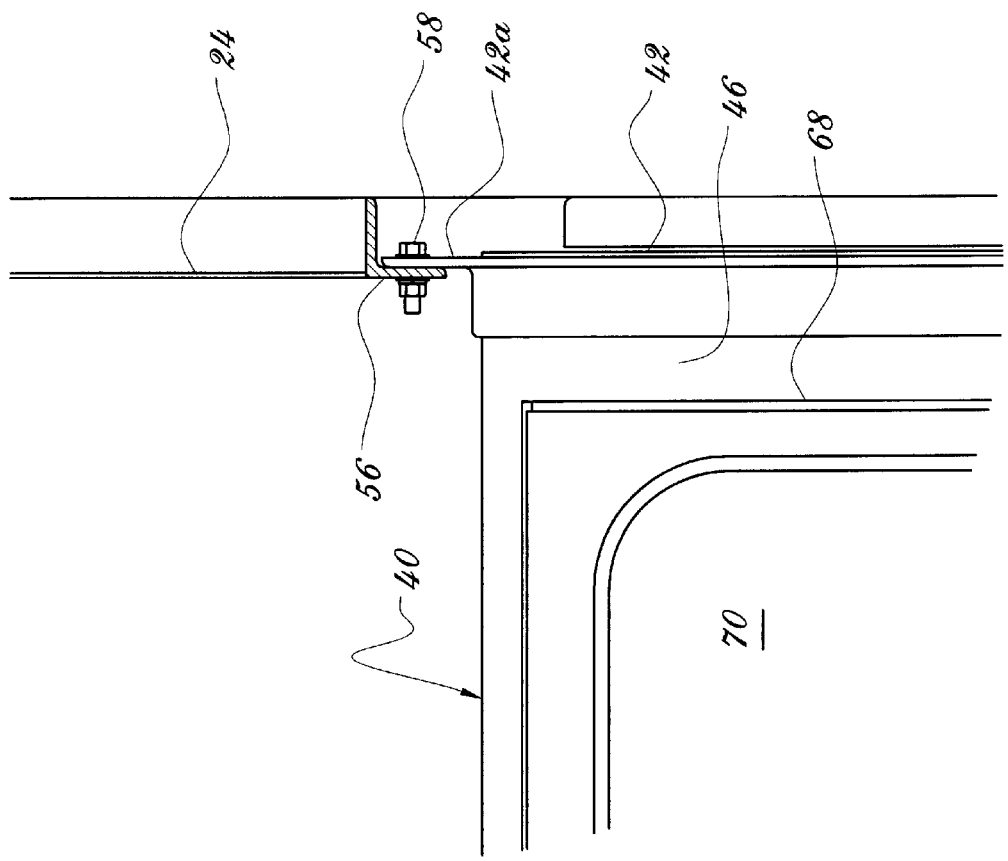
FIG. 3 is an enlarged view of area III in FIG. 2.
Figure 4:
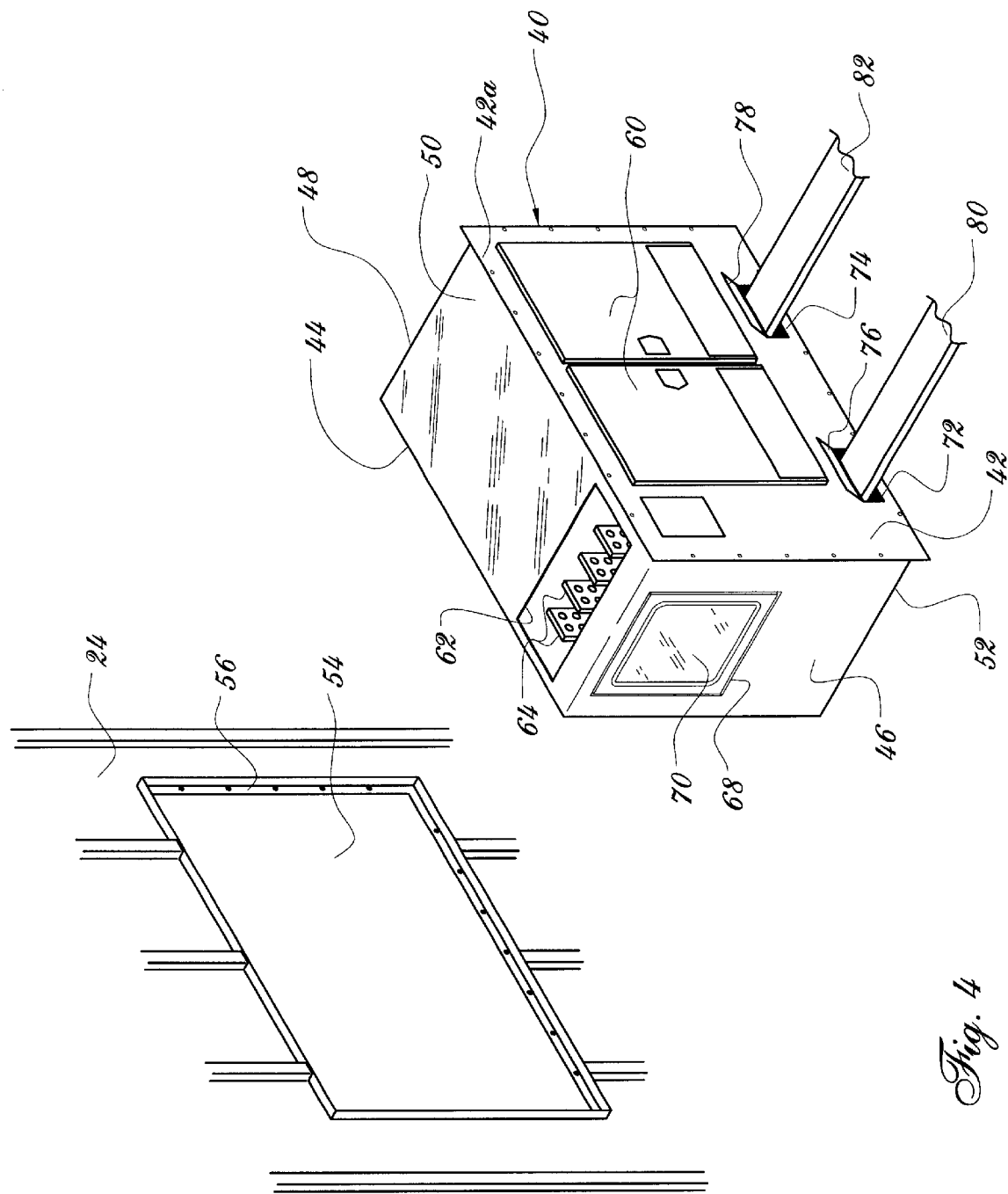
FIG. 4 is an enlarged perspective view of the rear portion of the side wall of the semi-trailer container of FIGS. 1 and 2, showing the breaker box removed from the semi-trailer container and further partly showing lift truck forks carrying the breaker box.

FIGS. 1 and 2 show a mobile generator unit 10 according to the present invention, which includes a semi-trailer container 12 carried over ground by means of rear wheels 14 mounted by pairs on axles 16, as known in the art. A pivotable front foot member 18 allows container 12 to be upheld in a horizontal position when semi-trailer 12 is not moving, and a front tow hitch 20 is provided for releasable attachment to a truck for carrying semi-trailer 12.

Semi-trailer container 12 further comprises a peripheral wall including a reinforced floor 22, two side walls 24, 26, front and rear end walls 28, 30, and a ceiling 32. Rear wall 30 is provided in the form of doors. A power generating motor assembly generally referred to as 34 is further provided inside container 12, including a motor, a flywheel, a drive, a muffler, exhaust pipes, a fuel tank, a cooling radiator, cooling fans, and other elements known in the art. Fresh air intake openings such as opening 36 are provided in the container peripheral wall, to cool the motor and the radiator, and at least one warm air outlet opening (not shown) is also provided. Preferably, acoustic louvers such as louvers 38 are provided on the fresh air openings.

FIGS. 1-4 show that mobile generator unit 10 also comprises a breaker box 40 which is installed inside semi-trailer container 12. Breaker box 40 comprises casing including a front wall 42, a rear wall 44, two side walls 46, 48, and top and bottom walls 50, 52. An opening 54 in the container side wall 24 is made for fitting breaker box 40 therethrough, with the breaker box front wall 42 having a peripherally protruding edge portion 42a for abutment against the receiving edge portion 56 of wall 24 circumscribing opening 54. Attachment members such as bolts 58 (FIG. 3) are used to securely although releasably attach breaker box 40 to container wall 24, with the breaker box front wall 42 being flush with the container side wall 24.

Figure 5:
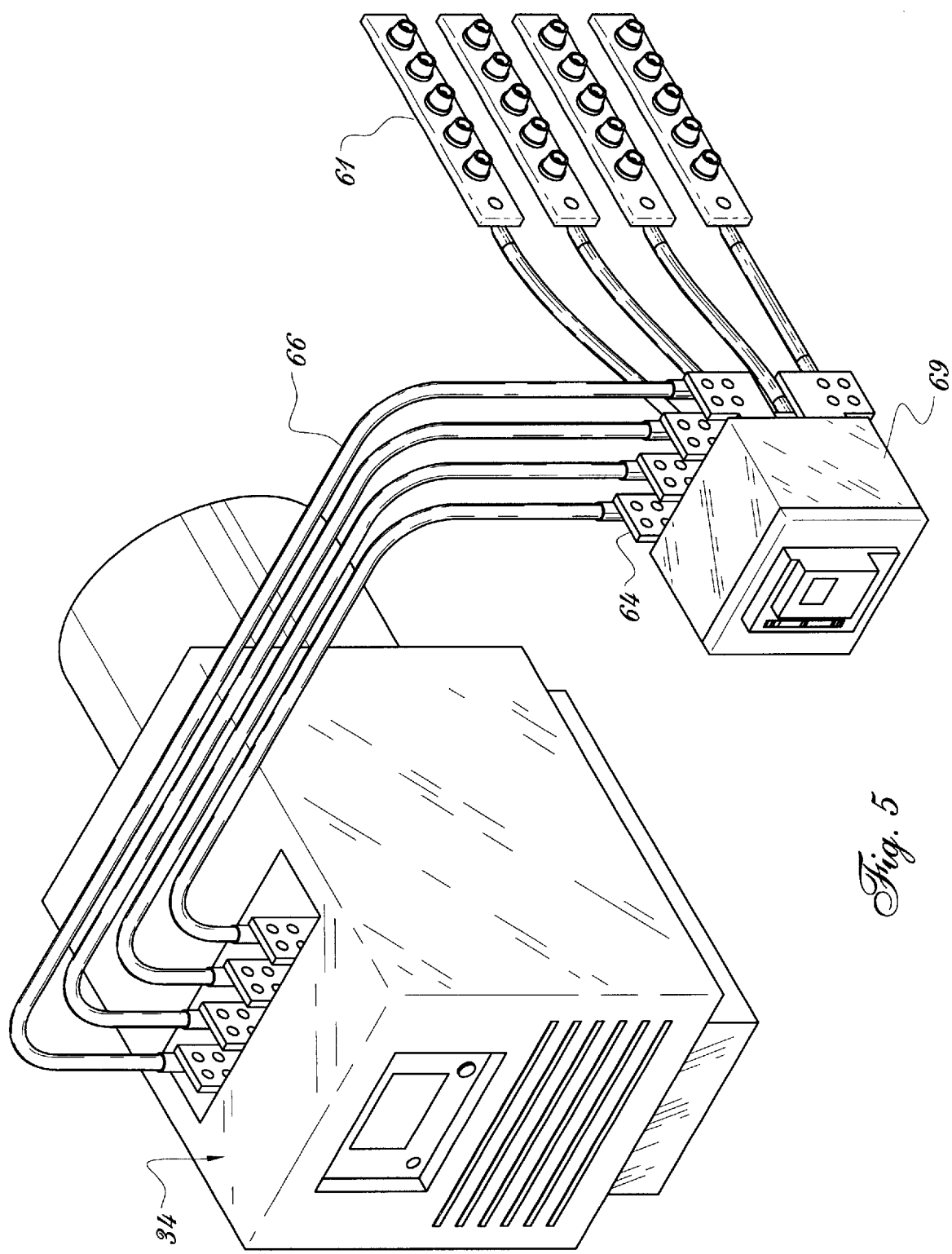
FIG. 5 shows the internal circuitry of the breaker box of the mobile generator unit, together with the power generating motor assembly and the circuitry link between the power generating motor assembly and the breaker box.

Breaker box 40 further includes a pair of front power outlet access doors 60, that provide access to the power outlet socket connectors 61 (FIG. 5) in which the different wire plugs are to be connected to obtain power from the power generating motor assembly 34. An opening 62 on the top wall 50 of breaker box 40 allows access to the power inlet socket connectors 64 which, as shown in FIGS. 1, 2 and 5, are operatively connected to power generating motor assembly 34 in a known fashion by means of appropriate wires 66.

A side door 68 is provided on the breaker box side wall 46 facing the semi-trailer doors 30, for allowing access to the breaker 69 located inside breaker box 40, for example for resetting the breaker if excessive power demand has changed the breaker from a closed condition (the circuit is closed and current can be fed to the external power grid requiring electricity) to an opened condition (the circuit is opened to prevent current to be fed). A window 70 in side door 68 allows visual inspection of the status of the breaker, i.e. if the breaker is in opened or closed condition.

There is provided in the front wall of breaker box 40, a pair of spaced-apart frontwardly opened pockets 72, 74 which can be selectively closed with a respective small flap door 76, 78, to prevent water or other particulate or animal life forms from entering pockets 72, 74. Pockets 72, 74 are sized, shaped and relatively positioned for engagement therein by the forks 80, 82 of a forklift truck. Thus, for carrying, removing or installing the heavy breaker box 40, a forklift truck may be used, with the forks stably upholding breaker box 40 by their engagement into pockets 72, 74.

For example, the following steps may be undertaken for installing breaker box on semi-trailer container 12:

a) inserting the forklift truck forks 80, 82 into the frontwardly opened pockets of breaker box 40;

b) lifting and moving breaker box 40 above ground outside of container 12, by carrying it with forks 80, 82, until it becomes aligned with opening 54 of container 12, and more particularly until its rear wall 44 becomes in facing register with opening 54;

c) sliding breaker box 40 into opening 54 until protruding edge portion 42a abuts against the container receiving edge 56;

d) fixing breaker box 40 to container 12 by bolting peripheral edge portion 42a to the wall window edge 56;

e) removing the forks of the forklift truck from the opened pockets of the breaker box; and f) connecting the generator power wires 66 to the breaker box power inlet socket connectors 64.

Inversely, breaker box 44 can be removed from container 12 by applying the following steps:

a) disconnecting the generator power wires 66 from the breaker box power inlet socket connectors 64;

b) inserting the forklift truck forks 80, 82 into the frontwardly opened pockets of breaker box 40;

c) disuniting breaker box 40 from container 12 by unbolting peripheral edge portion 42a from the wall window edge 56, breaker box 40 then coming to rest on forks 80, 82;

d) sliding breaker box 40 out of opening 54 with forks 80, 82 until rear wall 44 vertically clears the container wall 24; and e) moving breaker box 40 above ground outside of container 12, by carrying it with forks 80, 82, until it is stored at a desired location.

It is understood that since door flaps 76, 78 are provided on pockets 72, 74, they need to be pivoted into an opened condition before forks 80, 82 can be inserted into pockets 72, 74.

The advantages brought about by the present invention are as follows:

1) breaker box 40 can be installed and removed from outside of container 12, thus obviating the need to handle breaker box 40 inside semi-trailer 12;

2) the pockets 72, 74 allow for stable and easily accessible griping members for the forklift truck; and 3) conventional forklift trucks may be used to handle the otherwise heavy breaker box 40.

It is understood that other gripping members specifically adapted to other carrying devices could alternately be used, instead of providing pockets for the forks of a forklift truck.

We claim:

1. A mobile generator unit comprising:

a container having a generally closed peripheral wall and defining an inner chamber;

a power generating motor assembly carried in said container inner chamber;

an opening in said peripheral wall, with said wall defining a receiving edge portion protruding inside said opening;

a breaker box comprising:

a) a casing fitting into said opening in said peripheral wall and defining a peripherally protruding edge portion abutting against an outwardly-facing surface of said receiving edge portion;

b) a power inlet socket connection member mounted in said casing and accessible inside said container inner chamber;

c) a power outlet socket connection member mounted in said casing and accessible outside said container;

d) an accessible breaker mounted in said casing and connecting said inlet socket connection member and said outlet connection member for interrupting electrical current flow therebetween under excessive power demands; and e) pocket openings provided on said casing and accessible outside said container, for allowing external engagement therein of the forks or a forklift truck for moving and holding said casing;

an attachment member releasably attaching said peripherally protruding edge portion of said casing to said receiving edge portion protruding inside said opening of said container peripheral wall; and an electric plug member connected to said power generating motor assembly, releasably connected to said breaker box power inlet socket connection member and electrically connecting said breaker box to said power generating motor assembly.

2. A mobile generator unit as defined in claim 1, wherein said pocket openings provided in said casing are located in spaced relationship relative to said protruding edge portion of said casing.

3. A mobile generator unit as defined in claim 1, wherein said attachment member is bolts.

4. A mobile generator unit comprising:

a container having a generally closed peripheral wall and defining an inner chamber;

a power generating motor assembly carried in said container inner chamber;

an opening in said peripheral wall;

a breaker box comprising:

a) a casing fitting into said opening in said peripheral wall;

b) a power inlet socket connection member mounted in said casing and accessible inside said container inner chamber;

c) a power outlet socket connection member mounted in said casing and accessible outside said container;

d) an accessible breaker mounted in said casing and connecting said inlet socket connection member and said outlet connection member for interrupting electrical current flow therebetween under excessive power demands; and e) pocket openings provided on said casing and accessible outside said container, for allowing external engagement therein of the forks or a forklift truck for moving and holding said casing;

an attachment member releasably attaching said casing to said container peripheral wall; and an electric plug member connected to said power generating motor assembly, releasably connected to said breaker box power inlet socket connection member and electrically connecting said breaker box to said power generating motor assembly;

wherein said casing further includes door flap members mounted thereto which can selectively close said pocket openings.

5. A method of installing with a forklift truck having a pair of forks, a breaker box on a container of a power generating unit, said breaker box comprising a casing having a protruding peripheral edge portion and a pair of pocket openings sized and spaced to receive said forks of said forklift truck, with said pocket openings being located in spaced relationship relative to said peripheral edge portion, said breaker box further comprising a power inlet socket connection member mounted in said casing and accessible inside said container, said container having a generally closed peripheral wall defining an opening therein, with said container wall having a receiving edge portion protruding inside said opening, said container enclosing a power generating motor assembly having an electric plug member, said method comprising the following steps:

a) inserting the forklift truck forks into the pocket openings of the breaker box;

b) moving the breaker box above ground outside of the container, by carrying it with the forklift truck, until it becomes aligned with the opening of the container;

c) sliding the breaker box into the container peripheral wall opening until the breaker box protruding peripheral edge portion abuts against the container receiving edge portion protruding inside said opening;

d) fixing the breaker box to the container by bolting the breaker box peripheral edge portion to the peripheral wall receiving edge portion;

e) removing the forks of the forklift truck from the pocket openings of the breaker box; and f) connecting the plug member to the breaker box power inlet socket connection member.

6. A method as defined in claim 5, with the breaker box casings further including door flap members mounted thereto which can selectively close said pocket openings, further comprising the following step before step (a):

aa) moving the door flaps into an opened condition in which they do not obstruct the passage of the forks of the forklift truck into the pocket openings of the breaker box casing.

7. A method as defined in claim 6, further comprising the following step between steps (e) and (f):

ff) moving the door flaps into a closed condition in which they close the pocket openings of the breaker box casing.

8. A method for removing with a forklift truck having a pair of forks, a breaker box from a container of a power generator unit, said breaker box comprising a casing having a protruding peripheral edge portion and a pair of pocket openings sized and spaced to receive said forks of said forklift truck, with said pocket openings being located in spaced relationship relative to said peripheral edge portion, said breaker box further comprising a power inlet socket connection member mounted in said casing and accessible inside said container, said container having a generally closed peripheral wall defining an opening therein, with said container wall having a receiving edge portion protruding inside said opening, said container enclosing a power generating motor assembly having an electric plug member, said method comprising the following steps:

a) disconnecting the plug member from the breaker box power inlet socket connection member;

b) inserting the forklift truck forks into the pocket openings of the breaker box casing;

c) disuniting the breaker box from the container by unbolting the breaker box peripheral edge portion from the peripheral wall receiving edge portion, the breaker box then coming to rest on the forks of the forklift truck;

d) sliding the breaker box out of the opening until it clears the container peripheral wall; and e) moving the breaker box above ground outside of the container, by carrying it with the forklift truck, until it is stored at a desired location.

9. A method as defined in claim 8, with the breaker box casing further including door flap members mounted thereto which can selectively close said pocket openings, further comprising the following step between steps (a) and (b):

bb) moving the door flaps into an opened condition in which they do not obstruct the passage of the forks of the forklift truck into the pocket openings of the breaker box casing.

\* \* \* \* \*